No. 761,974. PATENTED JUNE 7, 1904.
A. LEVEDAHL.
YIELDING CONNECTION FOR DRIVING GEAR.
APPLICATION FILED FEB. 15, 1904.
NO MODEL.
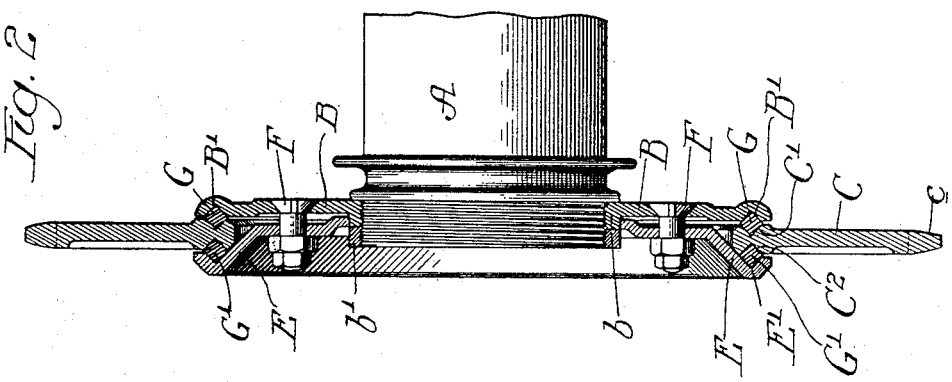
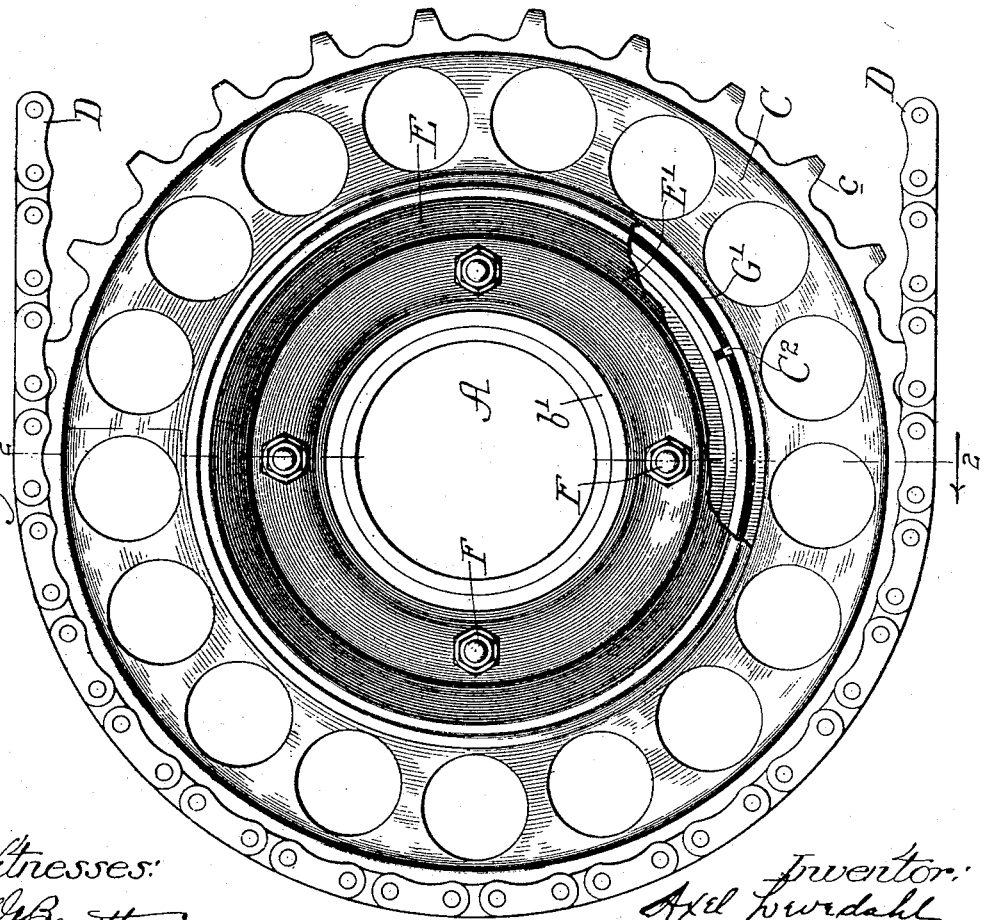
Witnesses: Inventor: Axel Levedahl by Cooke & Brown his Atty's No. 761,974. Patented June 7, 1904.

UNITED STATES PATENT OFFICE.

AXEL LEVEDAHL, OF AURORA, ILLINOIS, ASSIGNOR TO AURORA AUTOMATIC MACHINERY COMPANY, OF AURORA, ILLINOIS, A CORPORATION OF ILLINOIS.

YIELDING CONNECTION FOR DRIVING-GEAR.

SPECIFICATION forming part of Letters Patent No. 761,974, dated June 7, 1904.

Application filed February 15, 1904. Serial No. 193,597. (No model.)

*To all whom it may concern:*

Be it known that I, AXEL LEVEDAHL, a citizen of the United States, and a resident of Aurora, in the county of Kane and State of Illinois, have invented certain new and useful Improvements in Yielding Connections for Driving-Gear; and I do hereby declare that the following is a full, clear, and exact description thereof, reference being had to the accompanying drawings, and to the letters of reference marked thereon, which form a part of this specification.

This invention relates to an improved construction in yielding connections for driving-gears, and more especially to the features of construction in a wheel forming part of a driving-gear by which the two annular parts of the wheel through which motion is transmitted are joined by an annular friction device, permitting the slipping or movement of one annular part of the wheel with respect to the other under excessive strain or stress.

My invention is herein illustrated in connection with a sprocket-wheel which may form part of the driving-gear of a motor-driven vehicle, such as an automobile, or a pedal-driven vehicle, such as a bicycle; but the same features of construction may be applied for use in any kind of machine where a yielding connection between driving and driven parts may be needed.

The invention consists in the matters hereinafter described, and pointed out in the appended claims.

In the drawings, Figure 1 shows in side view a sprocket-wheel embodying my invention, together with a hub on which said sprocket-wheel is mounted and a driving-chain engaged with the sprocket-wheel. Fig. 2 is a sectional view taken upon line 2 2 of Fig. 1 of the wheel and hub or hollow shaft shown in said Fig. 1.

As shown in said drawings, A indicates a hollow shaft or wheel-hub; B, an annular interior part of the wheel, which is attached to said hub; C, an exterior annular part of the wheel, which in the instance illustrated is provided with peripheral sprocket-teeth $c$, and D is a driving-chain engaged with the peripheral teeth $c$ of the wheel.

The inner annular part B of the wheel is provided with a cylindric flange $b$, which has screw-threaded engagement with the end of the hub A and which is locked upon the same by means of a locking-ring or jam-nut $b'$. Said inner annular part may, however, be attached to a hub-shaft or the like in any manner found convenient or preferable.

Now referring to the parts more directly connected with my invention, the inner annular part B of the wheel has attached to it an annular clamping plate or ring E. The margin of the inner annular part B and that of the clamping-ring E together constitute two clamping parts adapted to embrace the margin of the outer part or wheel member C, which extends between them. Said clamping plate or ring E is connected with the annular part B by means affording adjustable connection between said parts, the device shown for this purpose consisting of bolts F F, inserted through said parts. The outer margins of the annular part B and clamping-plate E are separated from each other to receive between them the inner margin of the external ring or member C, the interior diameter of which is less than the exterior diameter of the said inner member B and clamping-ring E. The inner margin of said clamping-ring E is shown as arranged to fit upon the exterior surface of the flange $b$ of the inner member B, so as to hold the said clamping-ring concentric with the said inner member B. This particular construction is not, however, essential, and any suitable construction in the parts may be employed for holding the said inner member and the clamping-ring concentric with each other, or, if preferred, the devices which connect the clamping-ring with the member B, such as the bolts F, may be constructed to maintain said parts in concentric relation. Said inner member B is provided near its outer margin and in its inner face with an annular groove B', while the clamping ring or plate E is likewise provided with a like annular groove E', which corresponds with and is arranged opposite the groove B' in the inner part B. Near the inner margin of the exterior annular part C, on opposite sides thereof, are formed annular grooves C' and C². Said annular grooves C' and C² are of the same diameter as and arranged, respectively, opposite the grooves B' and E'.

G indicates a friction-ring which is interposed between the overlapping margins of the inner annular part B and the outer annular part C, and G' a like friction-ring which is interposed between the overlapping margins of the clamping-ring E and said outer part C. Said rings G G' are beveled on their surfaces which engage the inner member B, the clamping-ring E, and the outer member C, while the bearing-surfaces of the annular grooves B' E' and C' C² which engage said rings are correspondingly beveled or inclined. To afford such beveled or inclined contact-faces on the two rings G G', the latter are conveniently and preferably made square in cross-section and so arranged that two opposite angles of the square coincide with planes parallel with the faces of the wheel. Moreover, as a convenient and preferable way of forming the grooves B' E' and C' C² the same are made of V shape, as shown. Said rings G and G' are, moreover, not made continuous or annular, but are split or severed at one or more points, making them expansible and contractible. Preferably they will be severed at one point only, as indicated in Fig. 1, the severed ends of the rings being normally separated, so as to permit of expansion and contraction thereof.

When the parts described are assembled for use, as shown in the drawings, the clamping-bolts F or other adjustable means employed for holding the clamping ring or plate E upon the inner wheel member B will be tightened to produce frictional engagement of the rings G G' with the parts with which they are engaged. The said inner part B of the wheel and the clamping-ring E will be clamped against the rings G and G' with sufficient pressure to prevent slipping of the parts in contact one upon the other and consequent rotative movement of the exterior ring C with respect to the inner part B of the wheel except under unusual strain upon said parts or when the strain coming upon the wheel in transmitting motion from the driving to the driven part exceeds that which the parts are designed to withstand.

The provision of oblique or inclined contact-surfaces between the rings G and G' and the parts of the wheel engaged thereby, together with the split form of said rings, has the important advantage that these parts will automatically adjust themselves under the pressure brought on said rings by the clamping parts B and E, and thereby afford uniform frictional resistance to the turning of the parts. In other words, the said rings being split adjust themselves automatically, so as to closely and accurately fit or come in bearing against the walls of the grooves engaged thereby, so that notwithstanding any slight inaccuracies in the formation of the parts they will be pressed together with uniform pressure, and the inner and outer annular members of the wheel will be positively held from relative movement under ordinary strains or stresses, but will give, yield, or slip one with respect to the other whenever the stress or strain to which they are adjusted is exceeded.

It will of course be understood that a device embodying the same principles of construction as above set forth may have one instead of two interposed friction-rings and also that the clamping means may be located either on the inner or outer member of the wheel. Moreover, clamping members adapted to embrace the margin of one of the annular members of the wheel may be made in a variety of forms. The only essential feature, so far as this part of the wheel is concerned, is that one wheel member should embrace two clamping parts which are adapted to embrace or receive between them the marginal part of the other wheel member.

While the square or annular form of the friction-rings G G' constitute an important part of my invention and is herein claimed as such and the employment of such rings when made of split or expansible and contractible form likewise constitute an important part of my invention, yet it will be understood that in its broader aspect my invention is not limited to these particular features of construction and may be carried out by the use of a friction ring or rings of other form than that shown when applied and operating in the manner herein set forth.

I claim as my invention—

1. A wheel comprising two annular, concentric members, one of which forms the peripheral and the other the central part of the wheel, and the meeting margins of which overlap each other, said members being provided with opposed, annular grooves, a friction-ring interposed between said members and engaging said grooves, and means for clamping together said members.

2. A wheel comprising two annular, concentric members, said members being provided with opposed, annular grooves, a friction-ring interposed between said members and engaging said grooves, the contact-surfaces of the ring and grooves being oblique or inclined, and means for clamping together the said members.

3. A wheel comprising two annular, concentric members, said members being provided with opposed, annular grooves having angular bearing-surfaces, an expansible and contractible ring interposed between said members, and engaging said grooves, said ring having inclined or beveled faces for contact with the angular bearing-surfaces of the grooves, and means for clamping together said members.

4. A wheel comprising two annular, concentric members, said members being provided with opposed V-shaped grooves, a friction-ring interposed between said members and engaging said grooves, said ring having opposing angular faces adapted to fit within said V-shaped grooves, and means for clamping together said members.

5. The combination with a shaft, of two disks thereon having inwardly-facing annular grooves, one of the disks being provided with a hub by which it is attached to the shaft, a centrally-apertured wheel member the inner marginal part of which extends between the disks, friction members interposed between the disks and the wheel member and held in place by engagement with the said grooves, and clamping-bolts engaging both disks and passing through the central aperture of the wheel member.

6. A wheel comprising two annular members, one of which comprises two adjustably-connected clamping parts adapted to embrace the margin of the other member; at least one of said clamping parts and the adjacent face of the member which extends between said parts being provided with annular grooves and a friction-ring engaging said grooves.

7. A wheel comprising two annular members, one of which comprises two adjustably-connected clamping parts adapted to embrace the margin of the other wheel member, at least one of said clamping parts and the adjacent face of the interposed member being provided with grooves having inclined bearing-surfaces, and a split expansible ring which is inclined or beveled on its opposite faces to fit the inclined bearing-surfaces of said grooves.

8. A wheel comprising two annular members, one of which comprises two adjustably-connected clamping parts adapted to embrace the margin of the other wheel member, said clamping parts and the opposing faces of the interposed member, being provided with annular grooves, and two friction-rings the opposite faces of which fit within said grooves.

9. A wheel comprising two annular members, one of which comprises two adjustably-connected, clamping parts adapted to embrace the marginal part of the other wheel member, said clamping parts and the opposing faces of the interposed member being provided with grooves having inclined bearing-surfaces, and two expansible and contractible friction-rings, which are inclined or beveled on their contact-faces to fit the inclined bearing-surfaces of said grooves.

In testimony that I claim the foregoing as my invention I affix my signature, in presence of two witnesses, this 22d day of January, A. D. 1904.

AXEL LEVEDAHL.

Witnesses:
C. E. EUKSON,
E. M. WEST.